Patented July 1, 1941

2,248,035

UNITED STATES PATENT OFFICE 2,248,035

PROCESS OF NITROSATING AROMATIC ALKYL KETONES

Walter H. Hartung, Baltimore, Md., and Frank S. Crossley, Philadelphia, Pa., assignors to Sharp & Dohme, Incorporated, Philadelphia, Pa., a corporation of Maryland No Drawing. Application March 24, 1938, Serial No. 197,896

12 Claims. (Cl. 260—566)

This invention relates to a process for nitrosating aromatic alkyl ketones such as the phenyl-, naphthyl-, substituted phenyl-, and substituted naphthyl-alkyl ketones which are more generally employed for preparing the aromatic alpha-oximinoalkyl ketones.

Heretofore aromatic alkyl ketones were nitrosated by introducing an oximino group at the alpha carbon of the alkyl group thereof, and without nitrosating the aromatic nucleus, by dispersing such a ketone (in solution or suspension) in ether and adding a freshly distilled alkyl nitrite to the dispersion while bubbling dry hydrogen chloride gas through the reaction mixture. This method was exceedingly costly because of the very expensive reagents employed, the losses resulting from the nature of the reaction and further due to the ready decomposition of the alkyl nitrites, and the general incompleteness of the reaction, and the relatively large reaction volume for a given amount of initial ketone. At the same time this method was inherently dangerous because of the necessity of handling a highly reactive and inflammable mixture containing large quantities of ether and other constituents requiring the exercise of extreme caution to avoid the foaming or boiling over of the reaction mixture with the attending dangerous results.

It is, therefore, an object of this invention to effect the nitrosation of aromatic alkyl ketones avoiding the use of highly inflammable and explosive solvents such as ether and without employing highly unstable nitrosation agents such as the alkyl nitrites.

Another object is to introduce a relatively more economical method of producing aromatic alpha oximinoalkyl ketones, both from the consideration of time and reagents employed.

A further object is to provide a method of nitrosating aromatic alkyl ketones, whereby larger amounts of the initial ketone may be nitrosated at one time in a given volume, thereby increasing the production capacity of the equipment many times.

Still another object is the development of a method of nitrosating aromatic alkyl ketones whereby substantially little, if any, unreacted ketone is left at the end of the process.

Other objects will appear from the following detailed description of the invention.

In general, the invention involves treating the aromatic alkyl ketone starting material with an inorganic nitrite capable of reacting to give off nitrous acid under the reaction conditions, with an inorganic chloride capable of reacting to give off hydrogen chloride under the reaction conditions, together with sulfuric acid. The reaction is preferably carried out by dissolving or dispersing the ketone in a desirable amount of a suitable alcohol solvent and suspending the inorganic chloride therein. It is also desirable to include in the reaction mixture a small amount, usually a very small amount, of hydrochloric acid solution, preferably concentrated, to promote an earlier smoother initiation of the reaction. Better results are obtained when the reaction mixture is suitably agitated. It is desirable to add the sulfuric acid gradually or in such manner as to prevent the temperature of the reaction mixture from rising so high as to cause undesirable side reactions. While the sulfuric acid should be gradually added to the reaction mixture as just set forth, the whole of the required amount of the inorganic nitrite may be added at once at the beginning, or preferably also in portions. After the required amounts of nitrite and sulfuric acid have been added to the reaction mixture, it is beneficial to continue the agitation for a time of perhaps several hours to insure completion of the reaction. The mixture may then be permitted to stand over night, after which the end product can be purified by simply washing with water, or further purified, if desired, by recrystallization.

The aromatic alphaoximinoalkyl ketones prepared by the process of the invention are valuable as intermediates for the production of the corresponding amino alcohols many of which have been found to have valuable therapeutic properties.

The invention may be illustrated by, although not restricted to, the following example:

Phenyl alphaoximinoethyl ketone (alpha oximinopropiophenone or isonitrosopropiophenone) is prepared from propiophenone as follows: Into a suitable reaction vessel, such as a one liter three-necked flask, equipped with a dropping funnel, a mechanical stirrer, and a thermometer, and immersed in a water bath are placed 67 parts (0.5 mol) of propiophenone, 43.9 parts (0.75 mol) of sodium chloride, 2.4 parts of concentrated hydrochloric acid with 60 parts (1 mol) of isophopyl alcohol. To this reaction mixture, maintained under vigorous agitation throughout the process, there is added in portions and in the manner hereinafter described a total of 38 parts (0.55 mol) of sodium nitrite and 64 parts (0.65 mol) of concentrated sulfuric acid. First 9.5 parts, or one-quarter of the total required amount, of sodium nitrite is added and then 16 parts, or one-quarter of the total required amount, of the sulfuric acid is added through a dropping funnel during a period of about thirty minutes while the temperature of the reaction mixture is maintained below 35° C. After the addition of the first quarter of the required sulfuric acid, thirty minutes are allowed to elapse and a second one-quarter of the total required quantity of sodium nitrite followed by a second one-quarter of the total required quantity of the sulfuric acid is added in the manner and with the time interval previously described. Then the third one-quarter of the total required quantity of the sodium nitrite and of the sulfuric acid is added in the same manner. The last one-quarter of each of these reagents is then added except that the addition of the last one-quarter of sulfuric acid is extended over a period of sixty minutes, after which the agitation of the reaction mixture is continued for about three hours. After standing over night at room temperature, a solid mass of crystals of phenyl alphaoximinoethyl ketone forms. The product, after recrystallization from toluene melts at 113° C. to 114.5° C. Yields of at least 85%–95% of the end product based on the propiophenone are obtained. These results indicate that the reaction proceeds so far towards completion as to leave practically no reacted propiophenone to be separated and recovered.

In the example, the addition of the sodium nitrite and sulfuric acid was controlled as described in order to maintain the temperature of the reaction mixture within the range indicated. The temperature may be permitted to go as high as 60° C. before the reaction may become too vigorous, but it is preferable that it should not be permitted to exceed 40° C. to 50° C. The above described manner and timing of the addition of the nitrite and sulfuric acid may be varied to shorten the time required by external cooling or other means of cooling by indirect heat removal.

According to the process of the invention the following ketones have been converted into their respective alpha-oximino derivatives, having the respective melting points shown:

| Ketone | M. pt. of alpha oximino derivative |
| --- | --- |
|  | °C. |
| m-Nitropropiophenone | 158–159 |
| p-Chloropropiophenone | 118 |
| p-Hydroxybutyrophenone | 155 |
| p-Methoxypropiophenone | 120–121 |
| Valerophenone | 65.5–67 |

The process of the instant invention may be carried out on a wide variety of aromatic alkyl ketones. The aromatic radical in such aromatic alkyl ketones employed as starting materials in the process of the invention may be either the hydrocarbon or substituted hydrocarbon radical, such as the phenyl- or substituted phenyl-alkyl ketones, or the naphthyl- or substituted naphthyl-alkyl ketones, and the like. Thus the ketones suitable as initial materials may be represented by the general formula $X-Ar.CO.CH_2R$ in which Ar is the aromatic radical or residue of which X may be either hydrogen or one or more substituent radicals selected from the class consisting of halogen, hydroxy, alkoxy, nitro group, and sulfonic acid group, and in which R is hydrogen or an alkyl group. There need be no restriction to the number of carbon atoms in the alkyl group of the ketone initial material, for the corresponding oximino ketones, of which R of the general formula equals six or more may be made by this process. The term "aromatic" employed in the claims to describe one of the radicals of the ketones concerned in the invention shall be construed to be an aromatic radical selected from the group consisting of phenyl, substituted phenyl, naphthyl, and substituted naphthyl radicals.

Any inorganic nitrite capable of giving off nitrous acid upon treatment with a stronger acid such as sulfuric acid, may be employed. Any such suitable nitrite is referred to in the appending claims as an inorganic nitrite capable of reacting to give off nitrous acid under the reaction conditions. Particularly good results are obtained when using the alkali type nitrites such as the alkali metal nitrites and the alkaline earth metal nitrites because of their solubility in water and to a reasonable degree in alcohols. Examples of such suitable nitrites are sodium nitrite, potassium nitrite, calcium nitrite, magnesium nitrite, barium nitrite, and the like.

Any suitable alcohol may be used as the solvent for the ketone or as the dispersing medium for the reaction mixture other than the isopropyl alcohol mentioned, such as ethyl, n-propyl, n-butyl, benzyl, and phenyl ethyl alcohols, and the like. The aliphatic alcohols which are suitable as solvents or dispersing media for the reaction mixture in this invention are those from which it is generally possible to prepare alkyl nitrites.

In place of the sodium chloride described in the example, any other suitable inorganic chloride capable of reacting under the reaction conditions to liberate hydrogen chloride may be employed. The chlorides more readily applicable in the process are the alkali type chlorides, comprising the chlorides of the alkali metals and also of the alkaline earth metals, such as sodium or potassium chloride, or calcium or magnesium chloride. The sulfuric acid may be replaced by any other suitable acid capable of reacting with the nitrite to give off nitrous acid and with the chloride to give off hydrogen chloride.

The process of the invention is particularly attractive from a commercial standpoint because it avoids the cumbersome and inconvenient preparation of unstable substances. In this new method there is also avoided extended labor and time in the recovery of the end product for the desired product is obtained as a crystalline solid requiring for purification only the simple step of washing with water to remove inorganic salts, after which, if desired, the product may be further purified by crystallization from a suitable inert solvent such as toluene or benzine, preceded, if desired, by intermediate filtration. According to the invention the process can now be carried out with many times, for example, as many as six to eight times, the original charge of ketone in the reaction vessel than was possible by prior methods. Furthermore, the productive capacity (in desired end product) of the equipment is further increased by virtue of the fact that the initial ketone is so completely converted to the alpha oximino ketone sought.

While the process of the invention has been described in relation to certain specific embodiments of it, it is understood that many alterations or modifications thereof may be made without departing from the spirit of the invention which is to be restricted only to the scope of the appending claims as limited by the prior art.

We claim:

1. The method of nitrosating aromatic alkyl ketones, in which the aromatic radical is selected from the class consisting of radicals of the phenyl and the naphthyl series, at the alpha carbon of the alkyl group which comprises treating an aromatic alkyl ketone with an inorganic nitrite capable of reacting to give off nitrous acid under the reaction conditions, with an inorganic chloride capable of reacting to give off hydrogen chloride under the reaction conditions, together with sulfuric acid.

2. The method of nitrosating aromatic alkyl ketones, in which the aromatic radical is selected from the class consisting of radicals of the phenyl and the naphthyl series, at the alpha carbon of the alkyl group which comprises treating an aromatic alkyl ketone in the presence of an alcohol selected from the class consisting of the alkyl and phenyl-lower alkyl alcohols and from which it is possible to prepare an alkyl nitrite, with an inorganic nitrite capable of reacting to give off nitrous acid under the reaction conditions, with an inorganic chloride capable of reacting to give off hydrogen chloride under the reaction conditions, together with sulfuric acid.

3. The method of nitrosating aromatic alkyl ketones, in which the aromatic radical is selected from the class consisting of radicals of the phenyl and the naphthyl series, at the alpha carbon of the alkyl group which comprises treating an aromatic alkyl ketone in the presence of an alcohol selected from the class consisting of the alkyl and phenyl-lower alkyl alcohols and from which it is possible to prepare an alkyl nitrite, and in the presence of a relatively small amount of hydrochloric acid solution with an inorganic nitrite capable of reacting to give off nitrous acid under the reaction conditions, with an inorganic chloride capable of reacting to give off hydrogen chloride under the reaction conditions, together with sulfuric acid.

4. The method of nitrosating aromatic alkyl ketones, in which the aromatic radical is selected from the class consisting of radicals of the phenyl and the naphthyl series, at the alpha carbon of the alkyl group which comprises treating an aromatic alkyl ketone in the presence of an alcohol selected from the class consisting of the alkyl and phenyl-lower alkyl alcohols and from which it is possible to prepare an alkyl nitrite, and in the presence of a relatively small amount of hydrochloric acid solution with an inorganic nitrite capable of reacting to give off nitrous acid under the reaction conditions, with an inorganic chloride capable of reacting to give off hydrogen chloride under the reaction conditions, together with sulfuric acid, and agitating the reaction mixture.

5. The method of nitrosating aromatic alkyl ketones, in which the aromatic radical is selected from the class consisting of radicals of the phenyl and the naphthyl series, at the alpha carbon of the alkyl group which comprises treating an aromatic alkyl ketone in the presence of an alcohol selected from the class consisting of the alkyl and phenyl-lower alkyl alcohols and from which it is possible to prepare an alkyl nitrite, and in the presence of an inorganic chloride capable of reacting to give off hydrogen chloride under the reaction conditions and of a relatively small amount of hydrochloric acid solution by gradually adding an inorganic nitrite capable of reacting to give off nitrous acid under the reaction conditions and gradually adding sulfuric acid to the reaction mixture.

6. The method of nitrosating aromatic alkyl ketones, in which the aromatic radical is selected from the class consisting of radicals of the phenyl and the naphthyl series, at the alpha carbon of the alkyl group which comprises treating an aromatic alkyl ketone in the presence of an alcohol selected from the class consisting of the alkyl and phenyl-lower alkyl alcohols and from which it is possible to prepare an alkyl nitrite, and in the presence of an inorganic chloride capable of reacting to give off hydrogen chloride under the reaction conditions and of a relatively small amount of hydrochloric acid by adding, in portions of the total required amount, an inorganic nitrite capable of reacting to give off nitrous acid under the reaction conditions and, in portions of the total required amount, adding sulfuric acid to the reaction mixture.

7. The method of preparing aromatic alpha-oximinoalkyl ketones, in which the aromatic radical is selected from the class consisting of radicals of the phenyl and the naphthyl series, which comprises treating an aromatic alkyl ketone in the presence of an alcohol selected from the class consisting of the alkyl and phenyl-lower alkyl alcohols and from which it is possible to prepare an alkyl nitrite, and in the presence of an organic chloride capable of reacting to give off hydrogen chloride under the reaction conditions and of a relatively small amount of hydrochloric acid solution, by alternately adding to the reaction mixture separate portions of the total required amount of an inorganic nitrite capable of reacting to give off nitrous acid under the reaction conditions and of the total required amount of sulfuric acid and permitting an appreciable time to elapse between the completion of the addition of a portion of sulfuric acid to the commencement of the subsequent addition of the nitrite, the addition of the separate portions of the nitrite and of the sulfuric acid being so timed that the reaction mixture is maintained throughout the entire process at a temperature below about 60° C., allowing the reaction mixture to cool after the last addition of sulfuric acid and separating the aromatic alphaoximinoalkyl ketone.

8. The process as in claim 7, in which the reaction mixture is agitated throughout the process until solidification takes place.

9. The method of preparing aromatic alpha-oximinoalkyl ketones, in which the aromatic radical is selected from the class consisting of radicals of the phenyl and the naphthyl series, which comprises treating an aromatic alkyl ketone in the presence of an alcohol selected from the class consisting of the alkyl and phenyl-lower alkyl alcohols and from which it is possible to prepare an alkyl nitrite, and in the presence of an inorganic chloride capable of reacting to give off hydrogen chloride under the reaction conditions, and while agitating the reaction mixture throughout the entire process, by alternately adding to the reaction mixture separate portions of the total required amount of an inorganic nitrite capable of reacting to give off nitrous acid under the reaction conditions and of the total required amount of sulfuric acid and permitting an appreciable time to elapse between the completion of the addition of a portion of sulfuric acid to the commencement of the subsequent addition of the nitrite, the addition of the separate portions of the nitrite and of the sulfuric acid being so timed that the reaction mixture is maintained throughout the entire process at a temperature below about 60° C., allowing the reaction mixture to cool after the last addition of sulfuric acid and separating the aromatic alphaoximinoalkyl ketone.

10. The method of preparing aromatic alphaoximinoalkyl ketones, in which the aromatic radical is selected from the class consisting of radicals of the phenyl and the naphthyl series, which comprises treating an aromatic alkyl ketone in the presence of an alkyl alcohol from which it is possible to prepare an alkyl nitrite, with an inorganic nitrite capable of giving off nitrous acid under the reaction conditions, with an inorganic chloride capable of reacting to give off hydrogen chloride under the reaction conditions, together with sulfuric acid.

11. The method of preparing aromatic alphaoximinoalkyl ketones, in which the aromatic radical is selected from the class consisting of radicals of the phenyl and the naphthyl series, which comprises treating an aromatic alkyl ketone in the presence of an alcohol of the lower alkyl phenyl series with an inorganic nitrite capable of giving off nitrous acid under the reaction conditions, with an inorganic chloride capable of reacting to give off hydrogen chloride under the reaction conditions, together with sulfuric acid.

12. The method of preparing aromatic alphaoximinoalkyl ketones, in which the aromatic radical is selected from the class consisting of radicals of the phenyl and the naphthyl series, which comprises treating an aromatic alkyl ketone in the presence of an alcohol selected from the group consisting of alkyl and phenyl-lower alkyl alcohols and from which it is possible to prepare an alkyl nitrite, with an inorganic nitrite capable of reacting to give off nitrous acid under the reaction conditions, with an inorganic chloride capable of reacting to give off hydrogen chloride under the reaction conditioning, together with sulfuric acid, and so proportioning and timing the addition of the nitrite and of the sulfuric acid in such manner that the reaction mixture is maintained at a temperature below about 60° C.

WALTER H. HARTUNG.
FRANK S. CROSSLEY.